United States Patent [19]

Moriya

[11] Patent Number: 5,121,315
[45] Date of Patent: Jun. 9, 1992

[54] D.C.-A.C. POWER CONVERTER WITH MULTIPLE CONVERSIONS

[75] Inventor: Fumiyasu Moriya, Tokyo, Japan

[73] Assignee: Kabushiki Kaisha Toshiba, Kawasaki, Japan

[21] Appl. No.: 715,967

[22] Filed: Jun. 17, 1991

[30] Foreign Application Priority Data

Jul. 31, 1990 [JP] Japan .................................. 2-202865

[51] Int. Cl.$^5$ .............................................. H02M 7/44
[52] U.S. Cl. ........................................ 363/65; 363/28;
363/36; 363/37; 363/96; 363/98; 307/82
[58] Field of Search .................... 363/15, 17, 28, 34,
363/36, 37, 65, 71, 95, 96, 98, 132, 136, 137

[56] References Cited

U.S. PATENT DOCUMENTS

| | | | |
|---|---|---|---|
| 4,024,451 | 5/1977 | Nishino et al. | 363/37 |
| 4,719,550 | 1/1988 | Powell et al. | 363/37 |
| 5,018,058 | 5/1991 | Ionescu et al. | 363/95 |
| 5,031,088 | 7/1991 | Tanaka | 363/71 |
| 5,038,265 | 8/1991 | Paladel | 307/82 |

Primary Examiner—J. Sterrett
Attorney, Agent, or Firm—Oblon, Spivak, McClelland, Maier & Neustadt

[57] ABSTRACT

A power converter apparatus for an electric train, including at least a first modular power converter unit having a main circuit formed of switch for interrupting power from a D.C. power source, a first D.C.-A.C. power converter connected to the switch, an isolation transformer connected between the D.C.-A.C. power converter and a rectifier and a second D.C.-A.C. power converter connected to the rectifier. The switch and the first D.C.-A.C. power converter are controlled by a control signal derived from the difference between the output voltage of the first D.C.-A.C. power converter and the sum of a delayed soft starting control signal and a settable reference signal. The second D.C.-A.C. power converter is pulse width modulated. Preferably a second modular power converter unit having the same construction as the first unit is provided and has inputs connected in series or in parallel with inputs of the first unit. Load balance between the power converter units is maintained by detecting the output current of each unit and utilizing the detected output currents in conjunction with the control signal used to control switching of the switch and the first D.C.-A.C. power converter.

11 Claims, 3 Drawing Sheets

D.C.-A.C. POWER CONVERTER WITH MULTIPLE CONVERSIONS

BACKGROUND OF THE INVENTION

1. Field of the Invention

This invention relates to a power converter apparatus for an electric train.

2. Discussion of Background

In general, the conventional power converter apparatus is typically mounted in electric cars for driving induction motors and for supplying power to air conditioners. The conventional power converter apparatus is designed electrically and mechanically primarily as a function of the required load capacity. Since the required load capacity typically varies from one application to another, the conventional power converter apparatus is typically designed for the specific application to which it is to be used. In effect, a different electrical and mechanical design is used for each different application. This takes considerable time to design and estimate the reliability of the conventional power converter apparatus, and makes it difficult to manufacture the conventional power converter apparatus in a short time and at low cost. Because of the different electrical and mechanical designs used for various applications, it is difficult to standardize parts, and the net effect is that there is a lack of economy of scale in manufacture.

SUMMARY OF THE INVENTION

Accordingly, it is an object of the present invention to provide a new and improved power converter apparatus for an electric train, which has a short manufacturing time, is capable of mass production, and utilizes a common design and common parts thereby to reduce the total number of stock parts used in the apparatus.

To achieve the above object, the present invention includes a power converter unit including a semiconductor switch for interrupting power from a D.C. power source, a first D.C.-A.C. power converter for converting D.C. power of the D.C. power source into A.C. power, a rectifier for rectifying the output power of the D.C.-A.C. power converter to a D.C. power, a second D.C.-A.C. power converter for converting the D.C. output power of the rectifier into A.C. power for a load, an activate switch supplying a control signal for a control circuit, a delay circuit delaying the control signal, a reference voltage setter supplying a reference voltage for controlling the output voltage of the first D.C.-A.C. power converter, a voltage detector detecting the output voltage of the first D.C.-A.C. power converter, a first arithmetic circuit for adding the output of the delay circuit to the reference voltage and comparing the sum with the detected output voltage of the first D.C.-A.C. power converter at the output of the voltage detector, a first driver controlling the semiconductor switch in accordance with the comparison output of the first arithmetic circuit, a second driver controlling the first D.C.-A.C. power converter according to the comparison value of the first arithmetic circuit, a current detector detecting an output current of the second D.C.-A.C. power converter, a differential amplifier supplying a difference signal between the output signal of the current detector and a balancing control signal, a second arithmetic circuit for adding the output signal of the differential amplifier and an output signal of the first arithmetic circuit and supplying a signal for current control to another power converter apparatus, a pulse width modulation controller supplying a signal for pulse width modulation, and a third driver connected to the pulse modulation controller and supplying to the second D.C.-A.C. power converter the signal for pulse width modulation produced by the pulse width modulation controller.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
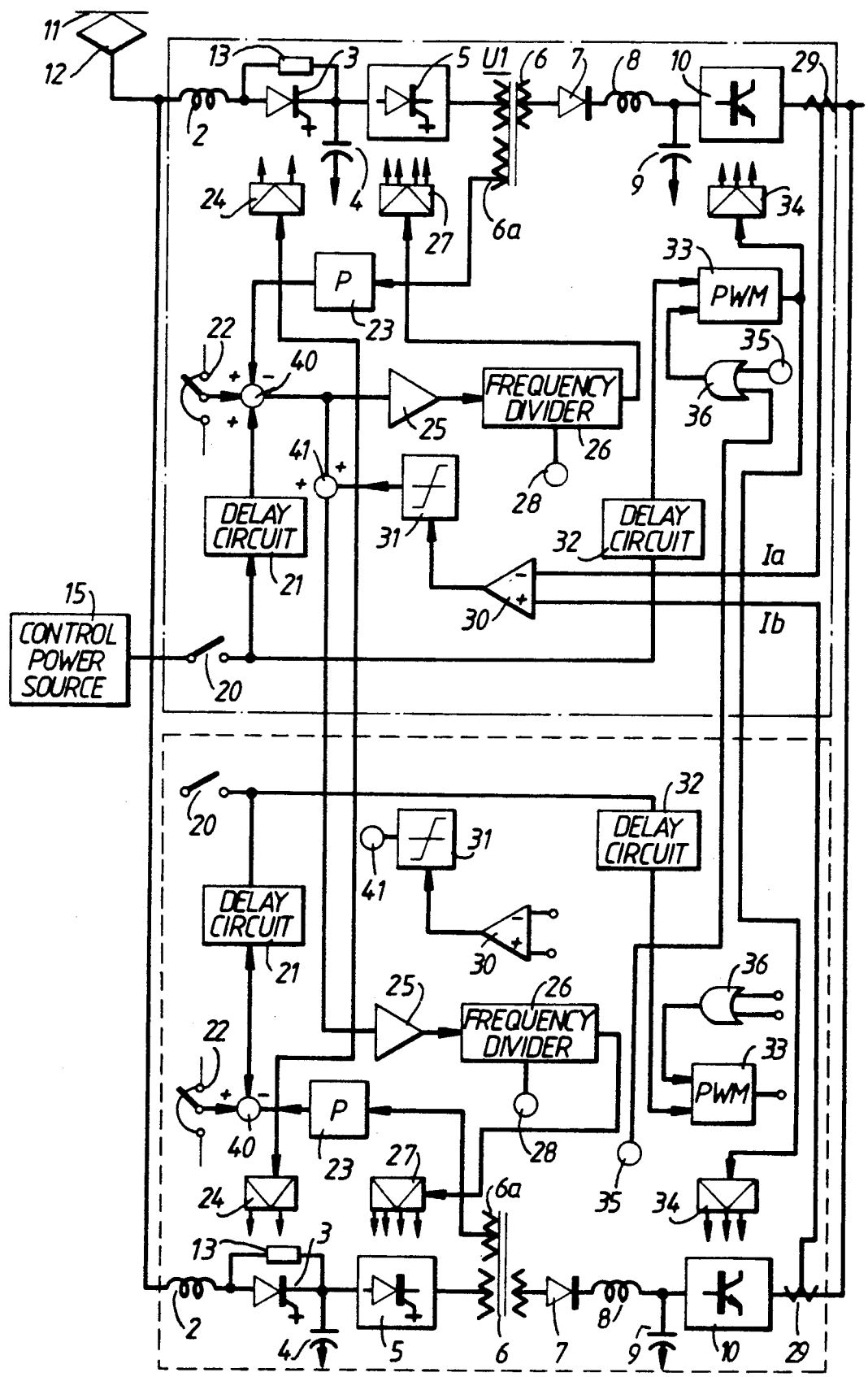
FIG. 1 is a circuit diagram of a preferred embodiment of the power converter apparatus of the present invention.

Referring now to the drawings, wherein like reference numerals designate identical or corresponding parts throughout the several views, and more particularly to FIG. 1 thereof, the power converter apparatus of a first embodiment of the present invention is shown to include two power converter units U1, U2, each having identical construction. Converter units U1, U2 are each connected to a trolley wire 11 by means of a pantograph 12, which supplies power to the converter units U1, U2 from the trolley wire 11.

Figure 2:
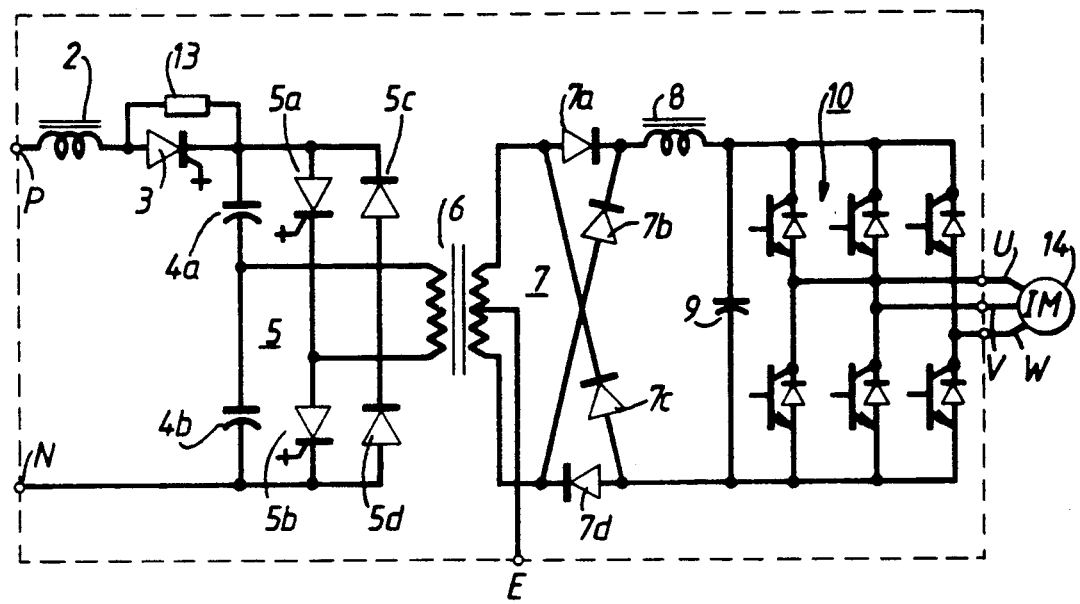
FIG. 2 is a circuit diagram illustrating in more detail a main circuit of the embodiment shown in FIG. 1.

As shown in FIG. 2, a main portion of the circuit shown in FIG. 1 includes a D.C. reactor 2, a thyristor switch 3, and condensers 4a, 4b connected to the input side of an invertor 5. The invertor is constituted of switching elements 5a, 5b connected in inverse reverse polarity with respect of the switching elements 5a, 5b. The invertor 5 performs the function of converting D.C. input power into A.C. power.

A reactor 13 is connected in parallel with the thyristor switch 3. An isolation transformer 6 transforms voltage of the primary winding into a required voltage, and isolates the circuits at the primary side from circuits at the secondary side. The secondary side of the transformer 6 is connected to a rectifier 7 formed of diode 7a, 7b, 7c and 7d, which converts A.C. power at the output of the invertor 5 into D.C. power. The output of the rectifier 7 is smoothed by means of a reactor 8 and a capacitor 9.

Connected to the smoothing circuit formed by the reactor 8 in the condenser 9 is an invertor 10 constituted of transistors having free wheeling diodes connected in inverse reverse parallel polarity with respective transistors. The output terminals U, V, W of the invertor 10 are connected to an induction motor 14 for driving an electric train.

The thyristor switch 23 and the invertor 5 are controlled by the control circuit shown in FIG. 1.

In the unit U1 shown in FIG. 1, an activate switch 20 is connected to a control power source 15 having a constant voltage. Control power source 15 provides a control signal to a delay circuit 21, which is connected to the switch 20 to enable soft starting. The power source is connected to the control circuit after the voltage of the main power circuit is established.

At an adding circuit 40, the output voltage of the invertor 5 is subtracted from the sum of a reference voltage provided by the reference voltage setting circuit 22, and the output voltage of the delay circuit 21. Also applied to the arithmetic circuit 40 is a signal produced by an auxiliary winding 6a of the transformer 6, this signal being proportional to the output voltage of the invertor 5.

At the moment of activation of the control circuit, the output voltage of the invertor 5, as detected by the auxiliary winding 6a, is controlled to coincide with the reference voltage produced by the reference voltage setting circuit 22. At that time, i.e., at the moment of activation, the output of the delay circuit 21 is zero. The reference voltage at the output of the circuit 22 is set at a small value.

The thyristor switch 3 and the invertor 5 are controlled by the output signal of the arithmetic circuit 40. More particularly, the output of the arithmetic circuit 40 is applied to a driver circuit 24 which controls the thyristor switch 3. The output of the arithmetic circuit 40 is also applied to a phase shift circuit 25, which is connected to a frequency divider 26 and the output of which is applied to a driver 27 which controls the invertor 5. Connected to the frequency divider 26 is a protection detector 28 which detects a short circuit fault in the invertor circuit 5, overheating of the switching elements 5a, 5b, or other abnormal conditions, and disables the output signal of the frequency divider 26 in the event that an abnormality is detected. In the absence of an abnormality, the output of the frequency divider 26 is applied to the driver 27. In this way, the switching elements of the invertor 5 are controlled so as to be turned off or turned on the basis of the output of the driver 27, and only in the absence of detection of any abnormalities by the protection detector 28.

The invertor 10 is controlled by a driver 34. Connected to the input of the driver 34 is the output of a pulse wave modulation (PWM) control circuit 33 which generates a pulse width modulation signal. The PWM control circuit 33 is activated by the voltage produced by the activate switch 20, which is delayed by the delay circuit 32 to enable soft starting. Driver 34 generates gate signals according to the output signal of the PWM control circuit 33. Applied to another input of the PWM control circuit 33 is the output of an OR logic circuit 36. Applied to one input of the OR logic circuit 36 is the output of a protection detector 35 provided in the unit U1, and the output of a second detection detector 35 provided in the unit U2. When one of the protection detectors 35 generates a signal indicating an abnormality, the output signal of the PWM control circuit is disabled or otherwise fixed according to a predetermined condition.

To control the main circuit of the unit U2, the output signal of the adding circuit 40 in the unit U1 is supplied to the driver 24 and the phase shift circuit 25 in the unit U2. The output signal of the PWM control circuit 33 in the unit U1 is also applied to the driver 34 in the unit U2.

Figure 3:
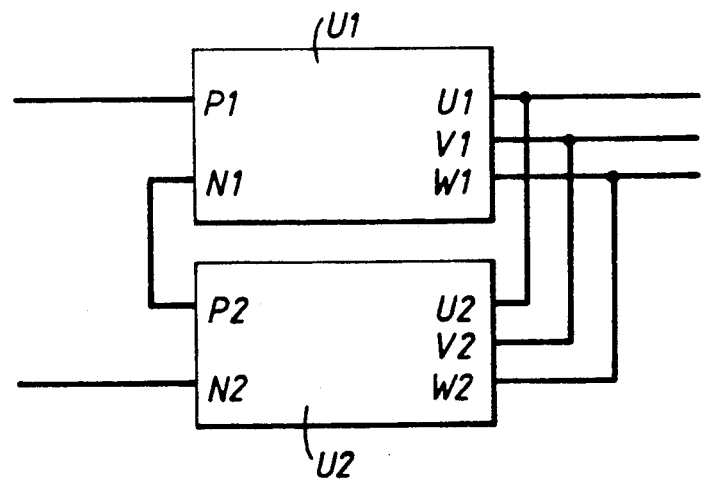
FIG. 3 is a block diagram illustrating a serial connection of power converter units of the present invention.
Figure 4:
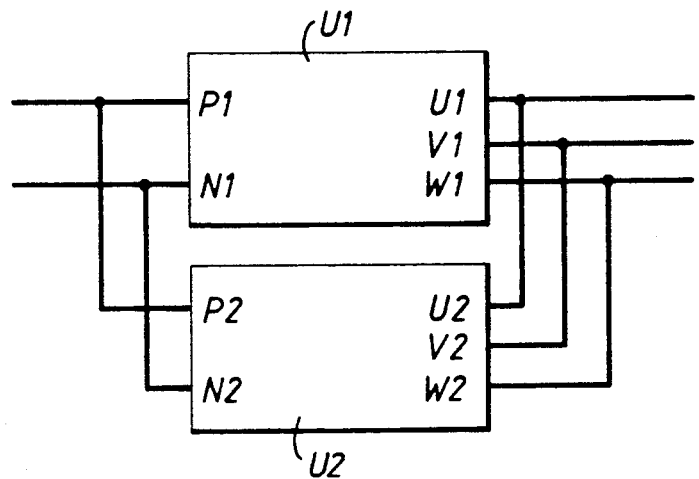
FIG. 4 is a block diagram illustrating a parallel connection of power converter units of the present invention.

FIGS. 3 and 4 illustrate different interconnections between the converter units U1 and U2. In FIG. 3, the D.C. power source sides of units U1, U2 are connected in series, and the A.C. output sides are connected in parallel. In FIG. 4, the D.C. power source sides of the units U1, U2 are connected in parallel, and the A.C. output sides are connected in parallel. In FIGS. 3 and 4, the A.C. output sides are connected in parallel because it is necessary to do so for the power converter application for which the power converter apparatus of the present invention is used. However, as is readily evident from FIGS. 3 and 4, the D.C. power source sides are connected in series or parallel according to the voltage of the power source.

A potential problem with the interconnection of converter units U1, U2 is that the load of the converter units may become unbalanced during operation. In order to avoid this problem, the output current values of the two converter units are controlled by a compensation circuit to be equal. In FIG. 1, the compensation circuit is constituted by the current transformers 29, a differential amplifier 30, a limiter 31 and an adder circuit 41. During operation, the current transformers 29 in the units U1 and U2 detect the output currents of the respective units. The differential amplifier 30 amplifies the difference between the output currents Ia and Ib produced in the coils 29 by the output currents of units U1 and U2, respectively, and the differential amplifier 30 generates a signal having a value of k(Ia - Ib). At the adding circuit 41, the output signal of the arithmetic circuit 40 and the output signal of the differential amplifier 30 are added, and the output signal is supplied to the phase shift circuit 25 in the unit U2. The limiter 31 limits the value of the output signal of the differential amplifier 30 to be within predetermined limits.

In operation of the compensation circuit shown in FIG. 1, if the current value Ia is larger than the current value Ib, the output signal of the differential amplifier 30 assumes a positive value, and in this case the compensation circuit operates to make the phase of the converter 5 of the unit U2 larger than that of the unit U1. If the current value Ia equals the current value Ib, the compensation circuit has no effect on operation. If the current value Ia is smaller than the current value Ib, the output signal of the differential amplifier 30 becomes negative. In this case, the compensation circuit operates to make the phase of the invertor 5 of the unit U2 smaller than that of the unit U1. Thus, due to operation of the compensation circuit, the output currents of the units U1 and U2 are balanced.

In the case of interconnection of the units U1 and U2 as shown in FIG. 3, the output voltage values of the units U1 and U2 are equal, because the output terminals of these units are connected in parallel. The equivalent resistance of the units U1 and U2 becomes equal because the output power of the units are equal. Accordingly, the input voltage in the input current of the units are balanced.

In case of interconnection of the units U1 and U2 as shown in FIG. 4, the input voltage values of the units U1 and U2 are equal, because the input terminals of the units are connected in parallel. The input current of the units are balanced, because the output power of the units are balanced.

According to the present invention, since the load of the converter units U1 and U2 can be balanced, the maximum capability of each unit can be achieved. In general, the voltage of the power source is 750V or 1500V. If a converter unit is manufactured as having a rated input voltage of 750V, a power converter apparatus of integer times the power capacity can be obtained by connecting the units in parallel. A power converter apparatus of 1500V input voltage can be obtained by connecting two units in series.

Figure 5:
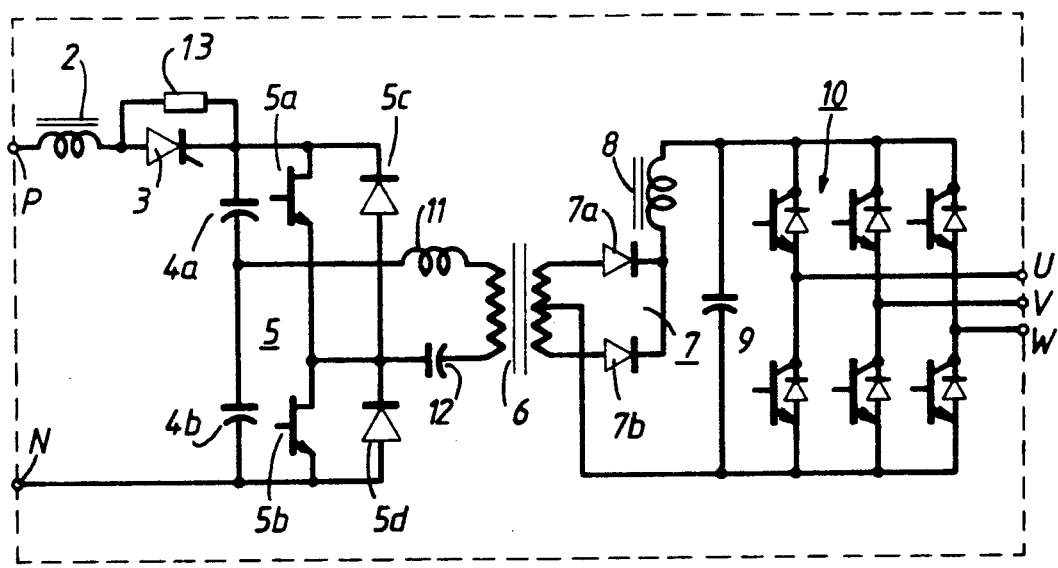
FIG. 5 is a circuit diagram illustrating in more detail the main circuit of a second embodiment of the present invention.

In the embodiment shown in FIG. 5, a reactor 11 and a condenser 12 are connected to the primary winding of the isolation transformer 6. The reactor 11 and the condenser 12 constitute a resonant circuit. In this embodiment, the switching elements are controlled so as to interrupt the current at zero current. In this embodiment of the main circuit, as the switching loss is a small value even if the switching elements are operated at high frequency, it is possible to make the reactor, condenser, transformer and other devices smaller in size and light in weight.

In the above-mentioned embodiment, the power converter apparatus is constituted as a VVVF control apparatus for driving a motor. But the power converter apparatus of the present invention is adaptable to a CVCF control apparatus by changing the constitution of the driver 34.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A power converter apparatus comprising:
   at least a first power converting unit for converting D.C. power into A.C. power, said unit including,
   a semiconductor switch means for interrupting power from a D.C. power source;
   a first D.C.-A.C. power converter means for converting D.C. power of said D.C. power source into A.C. power;
   a rectifier means for rectifying the A.C. output power of said D.C.-A.C. power converter means into D.C. power;
   a second D.C.-A.C. power converter means for converting the output power of said rectifier means into A.C. power for a load;
   an activate switch means for supplying a control signal for a control circuit;
   a delay circuit connected to said activate switch means for supplying said control signal with a delay;
   a reference voltage setting means for supplying a reference voltage for controlling an output voltage of said first D.C.-A.C. power converter means;
   a voltage detector for producing an output voltage corresponding to an output voltage of said first D.C.-A.C. power converter means;
   a first arithmetic means for adding an output signal of said delay circuit and said reference voltage and comparing the resulting sum with the output voltage of said voltage detector and producing a corresponding difference signal;
   first driver means for controlling said semiconductor switch means according to the difference signal produced by said first arithmetic means;
   second driver means for controlling said first D.C.-A.C. power converter means according to the difference signal of said first arithmetic means;
   a current detector for detecting an output current of said first power converting unit;
   a differential amplifier for supplying a difference signal between an output signal of said current detector and a balancing control signal;
   a second arithmetic means for adding the output signal of said differential amplifier and the difference signal output by said first arithmetic means, and supplying a corresponding signal for current control of another unit;
   a pulse width modulation controller for supplying an output signal for pulse width modulation; and
   third driver means for controlling said second D.C.-A.C. power converter according to the output signal of said pulse width modulation controller.

2. A power converter apparatus according to claim 1, further comprising:
   a second unit power converting unit having a constitution identical to said first unit;
   a first connecting means for supplying the output signal of said first arithmetic means of said first unit to said first driver means in said second unit;
   a second connecting means for supplying the output signal of said second arithmetic means of said first unit to said second driver means in said second unit; and
   a third connecting means for supplying the output signal of said pulse width modulation controller of said first unit to said third driver means in said second unit.

3. A power converter apparatus according to claim 2, comprising:
   said first unit having input terminals connected in series with input terminals of said second unit.

4. A power converter apparatus according to claim 2, comprising:
   said first unit having input terminals connected in parallel with input terminals of said second unit.

5. A power converter apparatus according to claim 3, comprising:
   said first and second units having outputs connected in parallel.

6. A power converter apparatus according to claim 4 comprising:
   said first and second units having outputs connected in parallel.

7. A power converter apparatus comprising:
   first and second power converter units each comprising,
   a switch means for interrupting power from a D.C. source,
   a first D.C.-A.C. power converter connected to an output of the switch means and producing an A.C. output,
   a rectifier,
   an isolation transformer having a primary winding connected to the A.C. output of the first D.C.-A.C. converter and a secondary winding connected to an input of said rectifier,
   a second D.C.-A.C. power converter connected to an output of said rectifier and outputting an A.C. output signal, and
   control means for controlling of said first D.C.-A.C. converter based at least in part on a control signal derived from a difference between the A.C. output of said first D.C.-A.C. power converter and a settable reference signal; and
   means for balancing loads of said first and second power converter units, comprising, means for producing a balance signal based on a difference between output currents produced by said second D.C.-A.C. power converters, and means for applying said balance signal to said control means of one of said units so that the control signal produced in said one of said units is also derived in part based on said balance signal.

8. A power converter apparatus according to claim 7, comprising:

said first unit having input terminals connected in series with input terminals of said second unit.

9. A power converter apparatus according to claim 7, comprising:

said first unit having input terminals connected in parallel with input terminals of said second unit.

10. A power converter apparatus according to claim 8, comprising:

said first and second units having outputs connected in parallel.

11. A power converter apparatus according to claim 9 comprising:

said first and second units having outputs connected in parallel.

* * * * *